United States Patent [19]
Fenner

[11] Patent Number: 6,069,851
[45] Date of Patent: May 30, 2000

[54] ENTERTAINMENT MICRO SYSTEM

[75] Inventor: Knut T. Fenner, Westfield, N.J.

[73] Assignees: Sony Corporation, Tokyo, Japan; Sony Electronics Inc., Park Ridge, N.J.

[21] Appl. No.: 09/107,495

[22] Filed: Jun. 30, 1998

[51] Int. Cl.[7] .................................................. H04B 1/20
[52] U.S. Cl. .................................................. 369/1; 369/12
[58] Field of Search .................................. 369/1, 2, 5, 6, 369/7, 10, 11, 12

[56] References Cited

U.S. PATENT DOCUMENTS

5,349,575  9/1994  Park ............................................. 369/1

*Primary Examiner*—Tan Dinh
*Attorney, Agent, or Firm*—Christopher M. Tobin

[57] ABSTRACT

The invention relates to an entertainment system having a playback device for retrieving data from a recording medium and for generating a signal corresponding to the data, wherein the playback device includes a transparent door which covers the recording medium. The system further includes a speaker for converting the signal into acoustical energy and a display device for displaying operational information regarding the system, such as the track number of the selection being played back, time remaining, track title, volume level, the sound and/or CD play mode which has been selected and others, on the door.

21 Claims, 7 Drawing Sheets

ENTERTAINMENT MICRO SYSTEM

FIELD OF THE INVENTION

This invention relates to stereo micro systems, and more particularly, to a stereo micro system having a CD cover which incorporates a display for providing information related to the operation of the micro system and other information.

BACKGROUND OF THE INVENTION

Stereo systems are widely used products which enable a user to listen to radio broadcasts and record and playback music. Such systems may include components such as an AM/FM tuner, one or more record/playback cassette decks, speakers, a CD player and others. Recently, there has been a demand on the part of consumers for stereo systems which are substantially reduced in size. These systems, which are known as micro component systems or micro systems, are desirable since they occupy relatively small areas in a home. Further, they are sufficiently compact and lightweight so as to enable a user to conveniently move the micro system from room to room in a house.

Micro systems typically include a front panel having various controls and a display such as a liquid crystal display (LCD). The display provides information related to the operation of the micro system such as the volume level, track number of the music selection being played, time remaining, the sound and CD play mode selected and others. However, in order to accommodate the amount of information that needs to be displayed, the LCD is relatively large in size and thus occupies a substantial portion of the front panel. This undesirably increases the size and weight of the micro system. Further, the addition of components or functions to the micro system will result in a further increase in the size of the LCD, thus further increasing the size of the micro system.

In order to load the CD into the CD player in such systems, a disc tray mechanism may be utilized. In use, the tray slides or moves out of the CD player to enable loading of the CD. The tray is then brought back into the CD player wherein the CD is placed in position for playback. However, this configuration has a disadvantage in that the CD is hidden. As such, identifying information, such as the music group or track titles, and graphics which may be included on the CD, cannot be seen. Alternatively, the CD player may have a door-type cover which is swung open to enable loading of the CD and subsequently closed to enable playback. Such doors typically include a small window which enables a user to see a portion of the CD. However, such systems still require the use of an LCD to display operational information for the micro system.

SUMMARY OF THE INVENTION

The invention relates to an entertainment system having a playback device for retrieving data from a recording medium and for generating a signal corresponding to the data, wherein the playback device includes a transparent door which covers the recording medium. The system further includes a speaker for converting the signal into acoustical energy and a display device for displaying operational information regarding the system on the door.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 1:
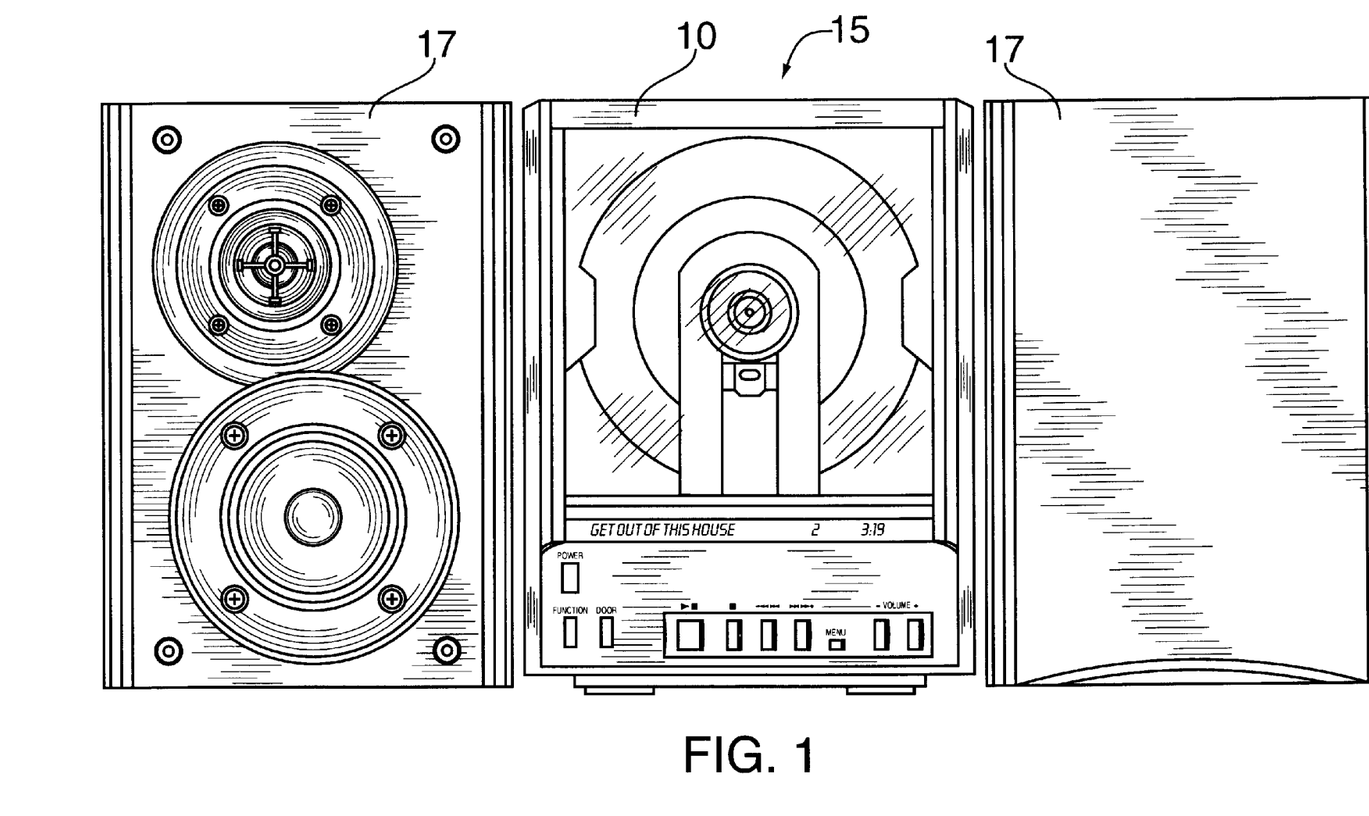
FIG. 1 is a front view of an entertainment micro system in accordance with the present invention.

Referring to FIG. 1, a front view of an entertainment micro system 15 in accordance with the present invention is shown. The system 15 includes speakers 17 which are electrically connected to a CD player 10 for playing back compact discs (CDS). In a preferred embodiment, the player 10 is adapted to play CDS utilizing conventional technology. However, the player 10 could be equally adapted to play or record on any other media, such as digital video discs or digital versatile discs (DVDs) or MiniDisc recordable discs manufactured by SONY Corporation.

Figure 2:
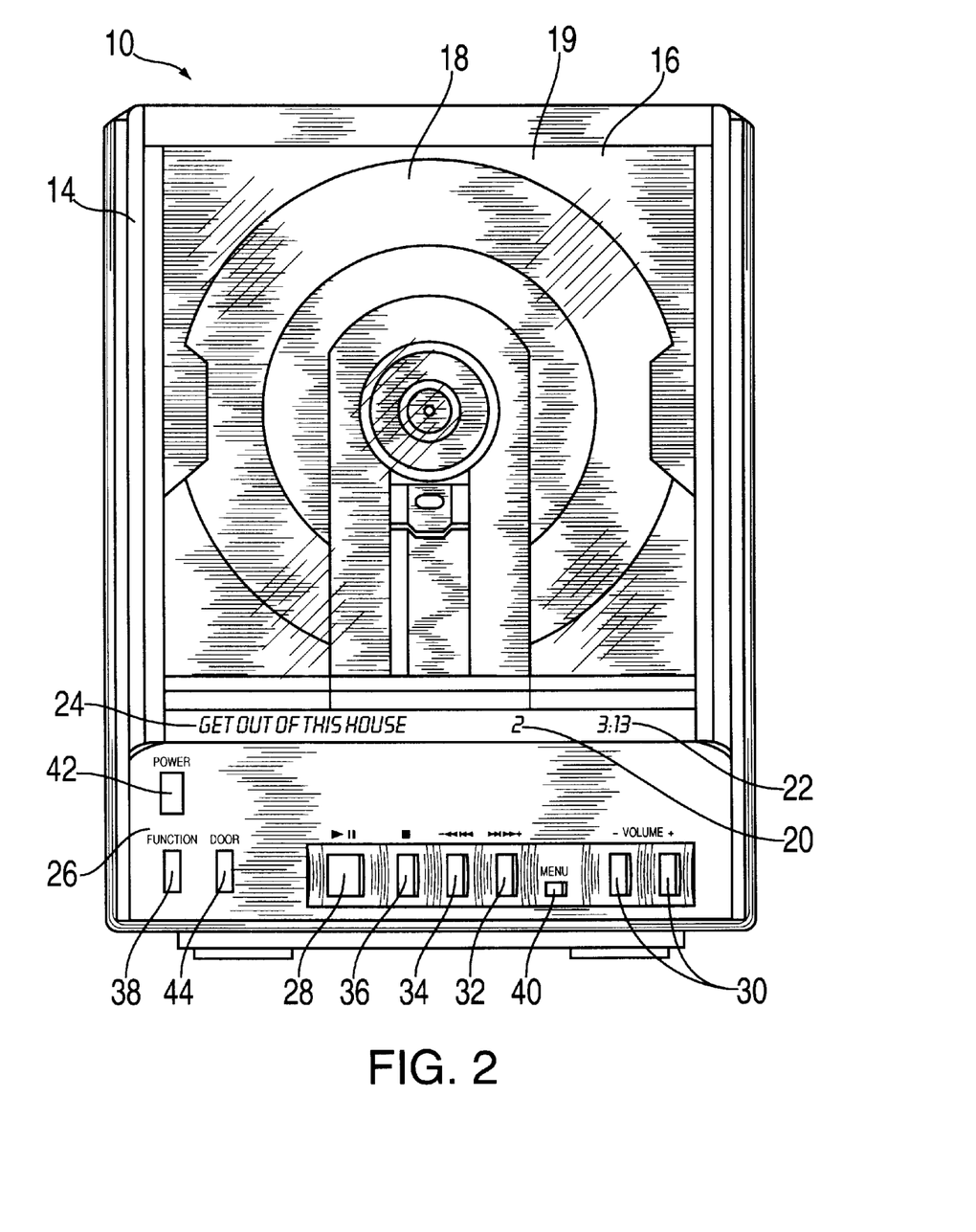
FIG. 2 is a front view of the player for the system.
Figure 3:
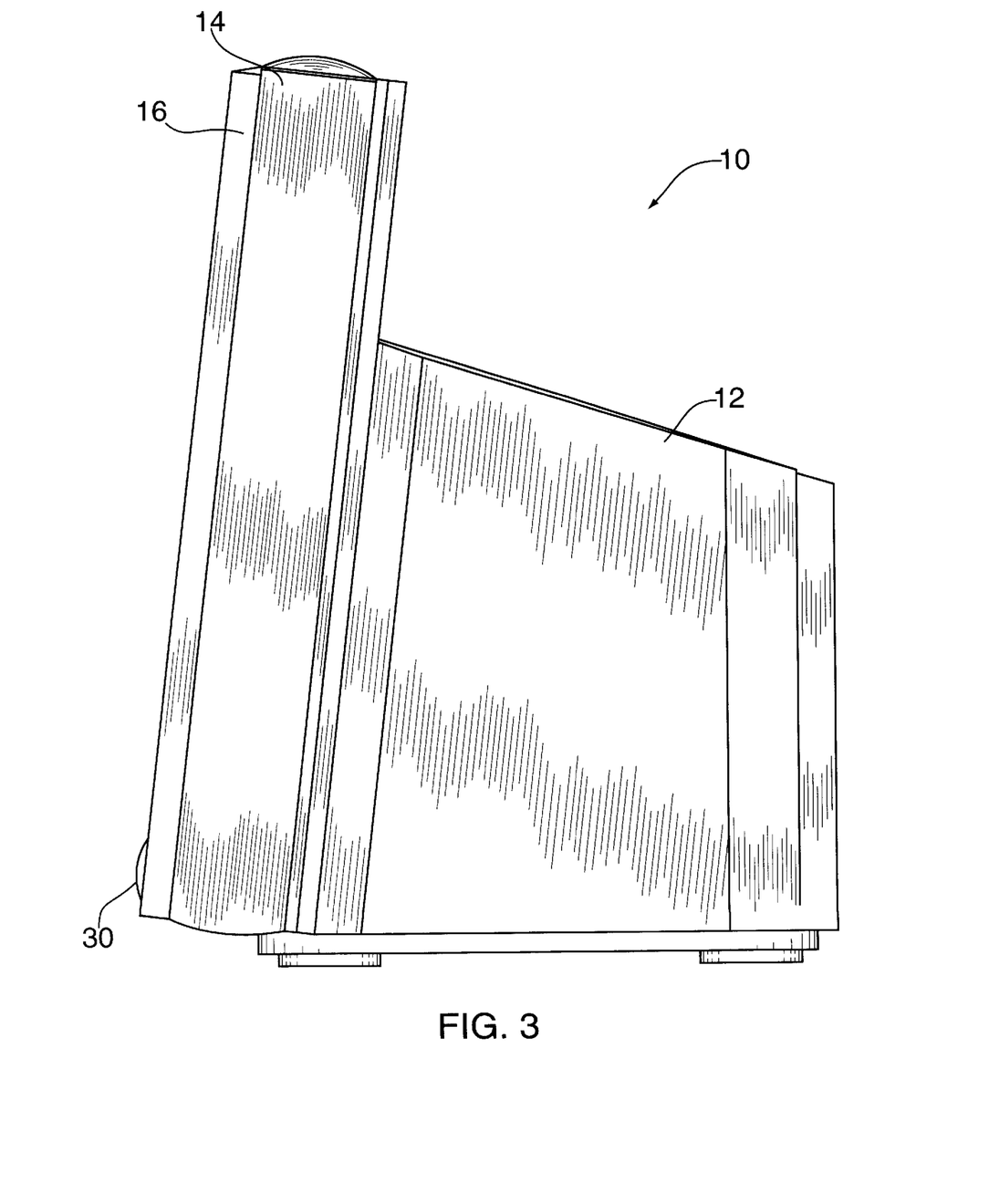
FIG. 3 is a side view of the player for the system.

Referring to FIG. 2 in conjunction with FIG. 3, front and side views, respectively, of the player 10 are shown. The player 10 includes an enclosure 12 for housing circuitry and components for operation of the player 10. Further, the player 10 includes a front panel 14 which is positioned at a suitable angle for providing access to the player 10. The front panel 14 includes a door 16 having a center portion 19 which is fabricated from a transparent material. A CD loading area 18 for loading a CD is positioned behind the door 16. As such, due to the transparency of the central portion 19, a CD which is positioned in the loading area 18 may be viewed by an observer. This enables information located on a surface of the CD, such as the name of the artist, track titles, graphics, and other information to be identified or seen by a user when the CD is loaded in the player 10. Further, the CD may include graphics which are adapted to develop into identifiable patterns or images when the CD rotates during playback and which are visible to an observer through the central portion 19. Alternatively, the central portion 19 may be fabricated from a translucent material which is sufficiently transparent so as to enable the user to identify the information located on the CD. Further, the entire door 16 may be fabricated from a transparent or translucent material.

In accordance with the present invention, the door 16 is utilized to display information related to the operation of the micro system. This eliminates the need for an LCD on the front panel 14 of the system 15, thus substantially reducing the size and weight of the system 15. In particular, the information is displayed such that it appears to be suspended within the door 16 when viewed by an observer. Further, areas adjacent the displayed information remain transparent or translucent, thus enabling substantial portions of the CD to be viewed simultaneously with the display of the operational information. The operational information may be displayed by utilizing readily available technology for providing an electronic display on a transparent or translucent material such as, for example, that used for digital clocks, calendars and other commercially available displays. By way of example, the door 16 may be used to display information typically displayed on an LCD of a micro system such as a track number 20 of the selection being played back, time remaining 22, track title 24 and others such as volume level and the sound and/or CD play mode which has been selected.

Positioned beneath the door 16 is a control panel 26 which includes conventional controls such as buttons/knobs for operating the player 10, such as play/pause 28, volume 30, fast forward 32, reverse 34, stop 36, function 38, menu 40 and power on/off 42 controls. In addition, the control panel 26 includes a door control 44 for operating the door 16. In one embodiment, the loading area 18 is stationary and the door 16 is opened so as to provide access to the loading area 18. In one approach, the door 16 may be slid or moved up relative to the front panel 14 by a drive mechanism so as to provide access to the loading area 18. Alternatively, the door 16 may be attached by a hinge to enable the door 16 to swing open. In this embodiment, a movable laser pickup is used wherein the pickup moves relative to the CD during playback.

Figure 4A:
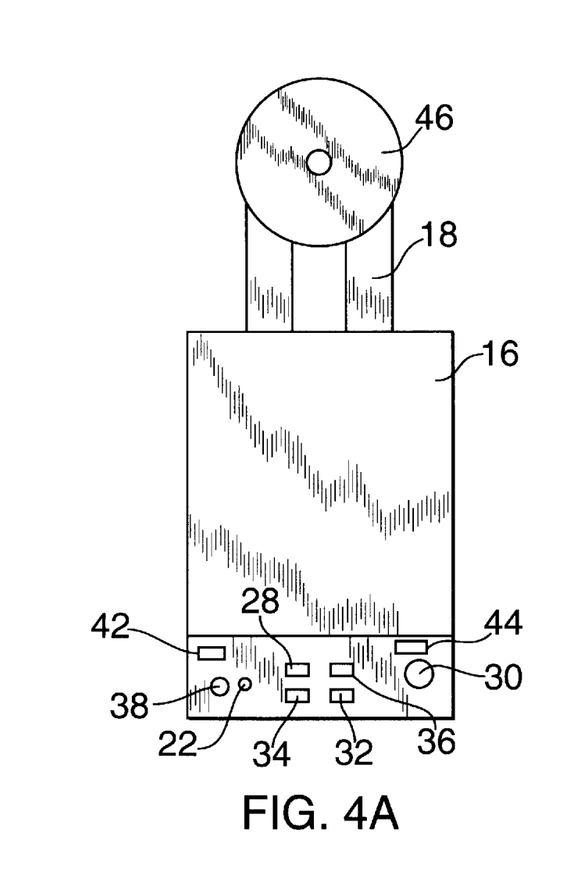
FIG. 4A is a view of the system depicting a loading area extended above the micro system to enable loading of a compact disc.
Figure 4B:
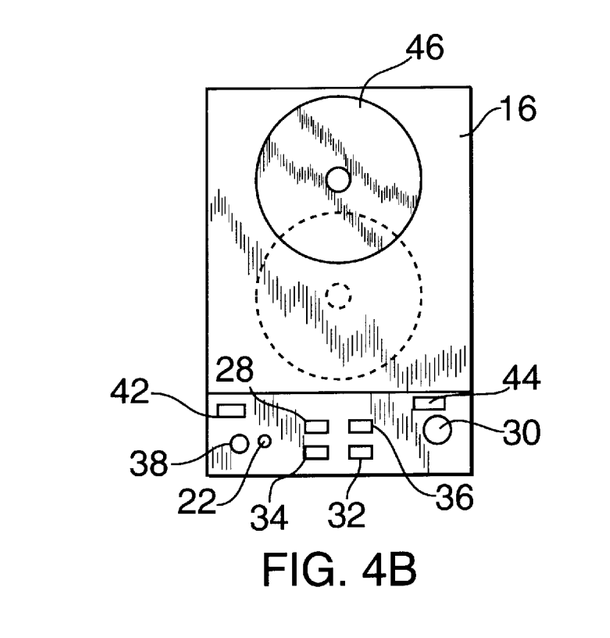
FIG. 4B is a view of the system depicting a CD which has been loaded in the system and which is being moved during playback.

In a second embodiment, a moveable loading area 18 is used in combination with a stationary door 16. Referring to FIG. 4A, the loading area 18 is slid or moved up relative to the door 16 by a drive mechanism such that the loading area 18 extends above the door 16 to enable loading of a CD 46. Referring to FIG. 4B, the CD 46 is then positioned in the loading area 18 and lowered to a first position in an upper portion of the player 10 behind the door 16. In this embodiment, a fixed laser pickup tracking device may be used wherein the CD 46 moves relative to pick up during playback. This causes the CD 46 to be lowered during playback to a second position (shown as dotted line) behind the door 16 which is closer to the control panel 26. As such, the CD rotates and moves relative to the door 16 during playback. Alternatively, a movable pickup may be used wherein the CD 46 does not move relative to the control panel 26.

Figure 5:
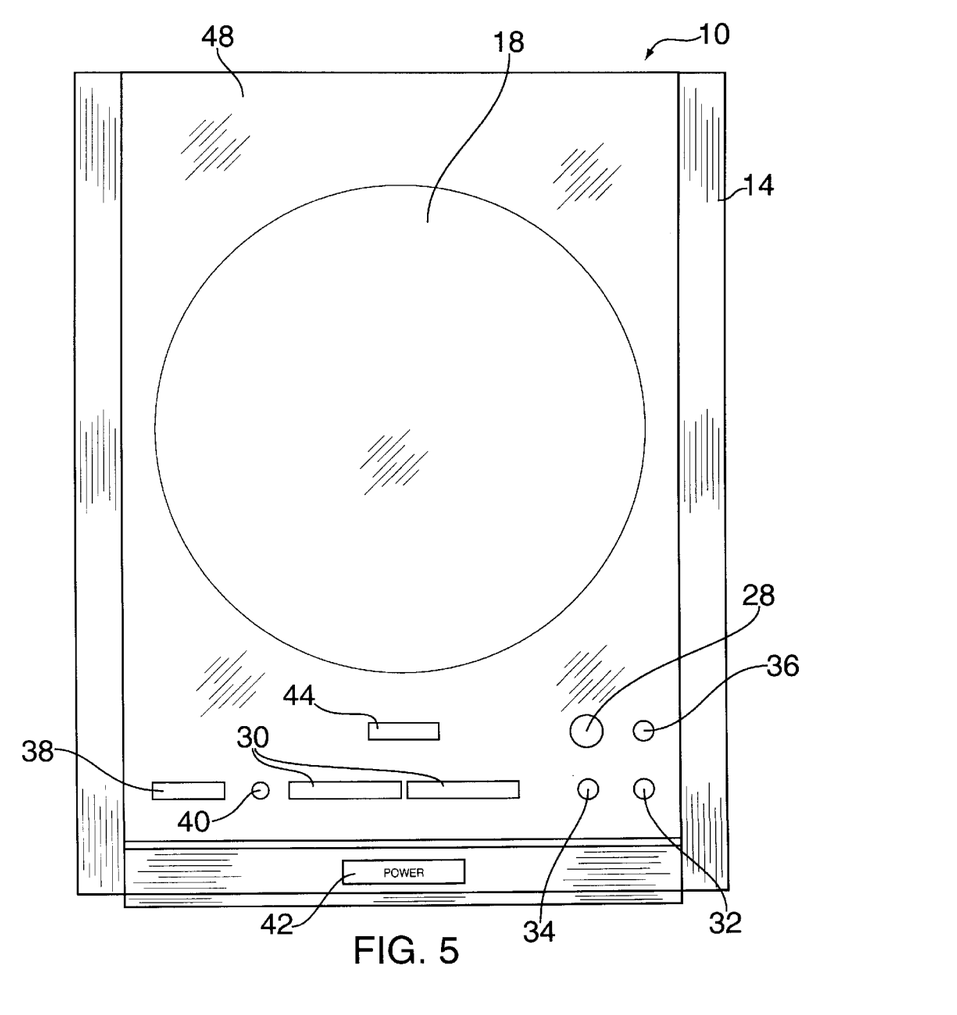
FIG. 5 is a front view of an alternate embodiment of the player of the system showing a door in a first position.
Figure 6:
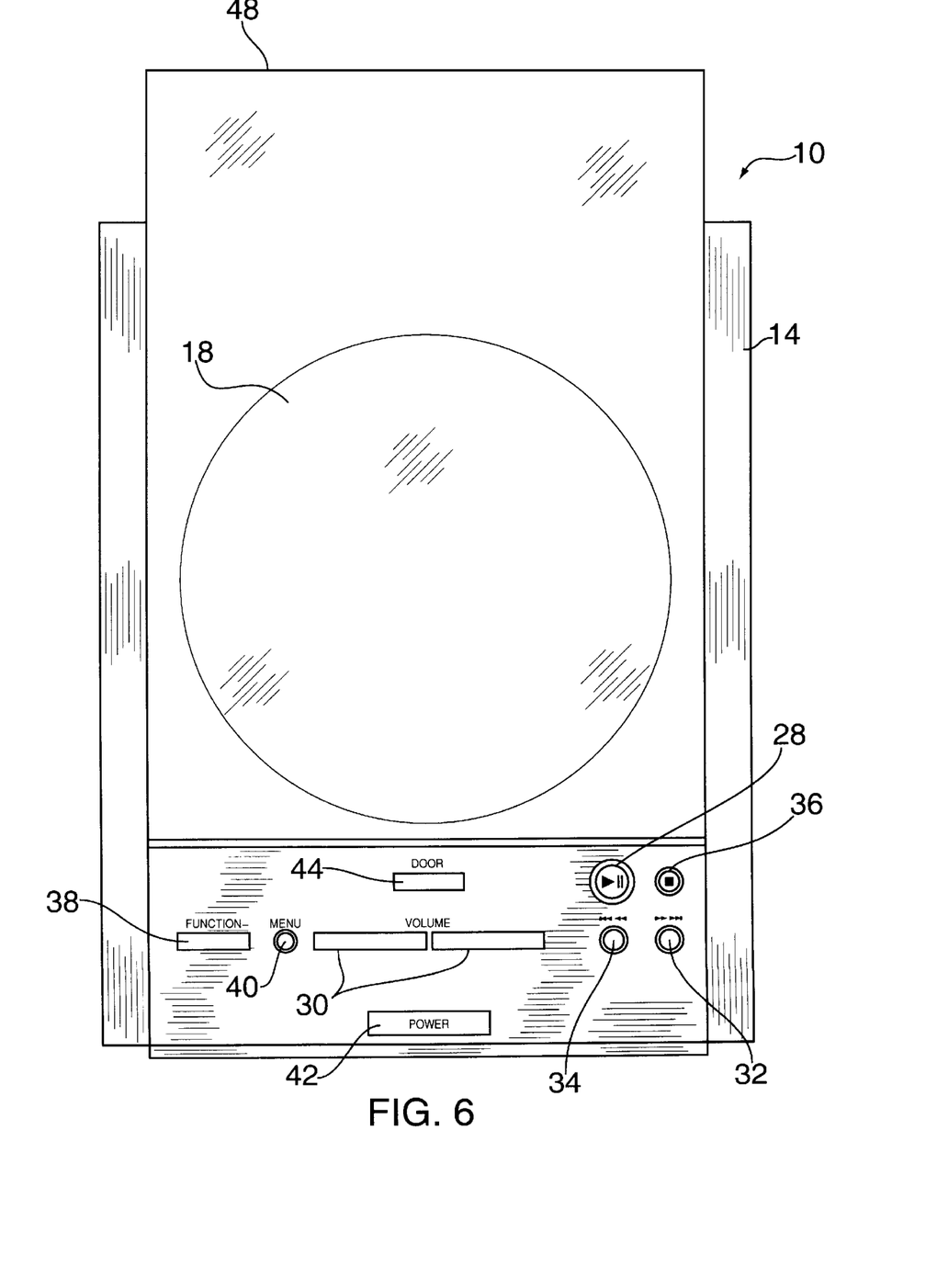
FIG. 6 is a front view of the alternate embodiment of the player showing the door in a second position which provides access to several controls of the system.
Figure 7:
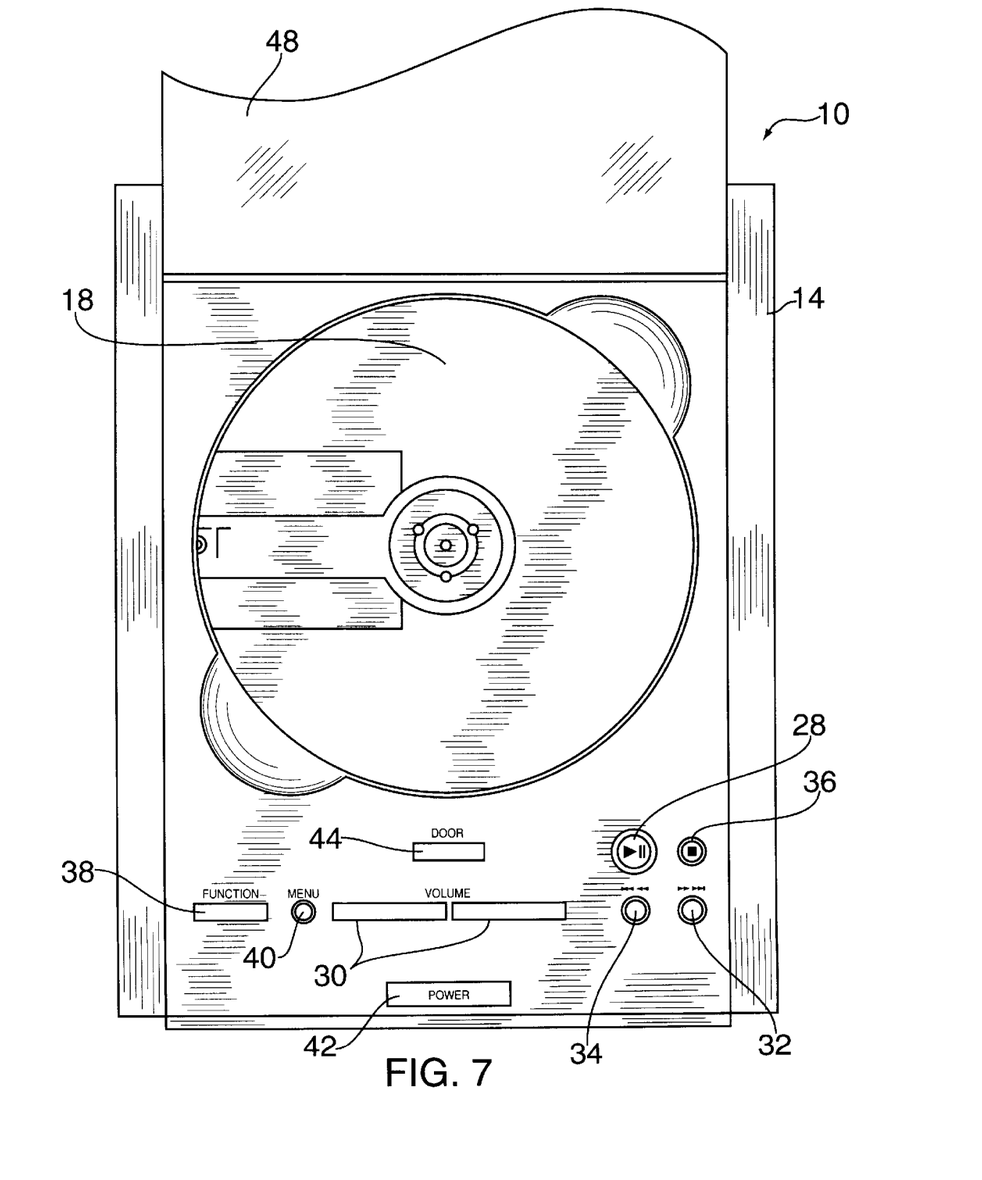
FIG. 7 is a front view of the alternate embodiment of the player showing the door in a third position which provides access to a loading area.

Referring to FIGS. 5, 6 and 7, an alternate embodiment of the player 10 is shown. In this embodiment, a three position door 48 which slides or moves up relative to the front panel 14 may be used. Referring to FIG. 5, the door 48 is shown in a first position wherein the micro system is off and the door 48 covers the loading area 18 and the controls for operating the system 15 such as the play/pause 28, volume 30, fast forward 32, reverse 34, stop 36, function 38, menu 40 and door 44 controls, except for the power control 42. When a user depresses the power control 42, a drive mechanism causes the door 48 to move upward to a second position wherein the controls 28,30,32,34,36,38,40,42,44 are uncovered but the loading area 18 remains covered by the door 48 as shown in FIG. 6. The user may then depress the door control 44, which causes the drive mechanism to move the door 48 upward to a third position wherein the loading area 18 is uncovered as shown in FIG. 7. After depressing the play 28 or door 44 controls again, the door 48 slides back down to the second position, thus covering the loading area 18. The system 15 may then be turned off by depressing the power control 42, which causes the door 48 to move back to the first position. In this embodiment either a movable or fixed pickup may be utilized.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. By way of example, the system 15 may be expanded so as to provided increased functionality. This may include connecting the system 15 to a computer or similar device which is adapted to control the system 15 as desired. Further, the system 15 may connected to an AM/FM tuner, cassette deck, DVD player and others in order to provide additional sources of entertainment. Accordingly, it is intended that the present invention embrace all such alternatives, modifications and variations as fall within the scope of the appended claims.

What is claimed is:

1. An entertainment system, comprising:
    playback means for retrieving data from a recording medium and for generating a signal corresponding to said data, said playback means including a transparent door which covers said recording medium;
    a loading area which is vertically moveable from a first position behind said door to a second position above said door to enable loading of said recording medium;
    speaker means for converting said signal into acoustical energy; and
    display means for displaying operational information regarding said system on said door.

2. The system according to claim 1 wherein said door remains transparent in areas adjacent said operational information displayed on said door.

3. The system according to claim 1 further including a control panel having controls for operating said system.

4. The system according to claim 1 wherein said door opens so as to provide access to a loading area for loading said recording medium.

5. The system according to claim 1 wherein said data is retrieved from said recording medium by a movable laser pickup device.

6. The system according to claim 1 wherein said data is retrieved from said recording medium by a fixed laser pickup device.

7. The system according to claim 1 wherein said system is controlled by a computer.

8. The system according to claim 1 wherein said system is connected to an AM/FM tuner.

9. The system according to claim 1 wherein said system is connected to a cassette deck.

10. The system according to claim 1 wherein said system is connected to a DVD player.

11. The system according to claim 1 wherein said recording medium is a compact disc.

12. The system according to claim 1 wherein said recording medium includes graphics which are adapted to develop into an identifiable image when said recording medium rotates during playback, wherein said image is visible through said door.

13. An entertainment system, comprising:
- playback means for retrieving data from a recording medium and for generating a signal corresponding to said data, said playback means including a transparent door which covers said recording medium;
- speaker means for converting said signal into acoustical energy;
- display means for displaying operational information regarding said system on said door wherein areas adjacent said operational information remain sufficiently transparent to enable a user to view said recording medium during playback; and
- a control panel having controls for operating said system, wherein when said system is turned off, said door is moveable to a first position in which said door covers said playback means and said controls and wherein said door is moveable to a second position in which said door is positioned to provide access to said controls and wherein said door is moveable to a third position in which said door is positioned to provide access to said playback means to enable loading of said recording medium.

14. The system according to claim 13 wherein said data is retrieved from said recording medium by a movable laser pickup device.

15. The system according to claim 13 wherein said data is retrieved from said recording medium by a fixed laser pickup device.

16. The system according to claim 13 wherein said system is controlled by a computer.

17. The system according to claim 13 wherein said system is connected to an AM/FM tuner.

18. The system according to claim 13 wherein said system is connected to a cassette deck.

19. The system according to claim 13 wherein said system is connected to a DVD player.

20. The system according to claim 13 wherein said recording medium is a compact disc.

21. The system according to claim 13 wherein said recording medium includes graphics which are adapted to develop into an identifiable image when said recording medium rotates during playback, wherein said image is visible through said door.

\* \* \* \* \*